(12) United States Patent
Cooke

(10) Patent No.: US 6,994,510 B2
(45) Date of Patent: Feb. 7, 2006

(54) FIVE AXIS PRODUCTION LINE HANDLER

(76) Inventor: Kenneth Cooke, 148 Batchelder Rd., Seabrook, NH (US) 03874

(*) Notice: Subject to any disclaimer, the term of this patent is extended or adjusted under 35 U.S.C. 154(b) by 175 days.

(21) Appl. No.: 10/456,601

(22) Filed: Jun. 6, 2003

(65) Prior Publication Data

US 2004/0258513 A1    Dec. 23, 2004

(51) Int. Cl.
*B66F 1/00* (2006.01)
(52) U.S. Cl. .................... 414/626; 414/783; 414/618
(58) Field of Classification Search ............. 414/560, 414/561, 591; 104/89, 90, 91; 105/148; 901/16
See application file for complete search history.

(56) References Cited

U.S. PATENT DOCUMENTS

| | | | |
|---|---|---|---|
| 3,655,232 A * | 4/1972 | Martelee ............. | 294/67.33 |
| 4,172,423 A * | 10/1979 | Monne ............. | 104/94 |
| 4,202,403 A * | 5/1980 | Miller ............. | 164/409 |
| 4,238,169 A * | 12/1980 | DePriester et al. ...... | 414/783 |
| 4,465,314 A * | 8/1984 | Parson et al. ......... | 294/81.6 |
| 4,724,944 A * | 2/1988 | Koshigai et al. ........ | 198/378 |
| 4,842,473 A * | 6/1989 | Zbornik ............. | 414/626 |
| 5,562,394 A * | 10/1996 | Brown, Jr. ........... | 414/626 |
| 6,202,566 B1 * | 3/2001 | Hutchinson .......... | 105/148 |

\* cited by examiner

*Primary Examiner*—Eileen D. Lillis
*Assistant Examiner*—Gregory W. Adams
(74) *Attorney, Agent, or Firm*—William F. Hamrock, PA

(57) ABSTRACT

A five-axis production-line handler has a handler shoulder (1) that is suspended rotatively downward from a gantry chassis (2). Two handler columns (4, 5) are spaced apart and suspended vertically downward from the handler shoulder. The handler columns terminate vertically above a production-line floor (6) for allowing horizontally circumferential positioning of the handler columns by rotation of the handler shoulder. The handler columns include hoist carriages (9, 10) that are raised and lowered by a hoist (7) for positioning item-rotation axles (11, 12) and attachment plates (29) to receive and rotate production items on an axis between the handler columns. The gantry chassis is gantry-wheel mobile on a gantry rail system for linear travel along a production line that can be linear or looped for a wide variety of production.

16 Claims, 9 Drawing Sheets

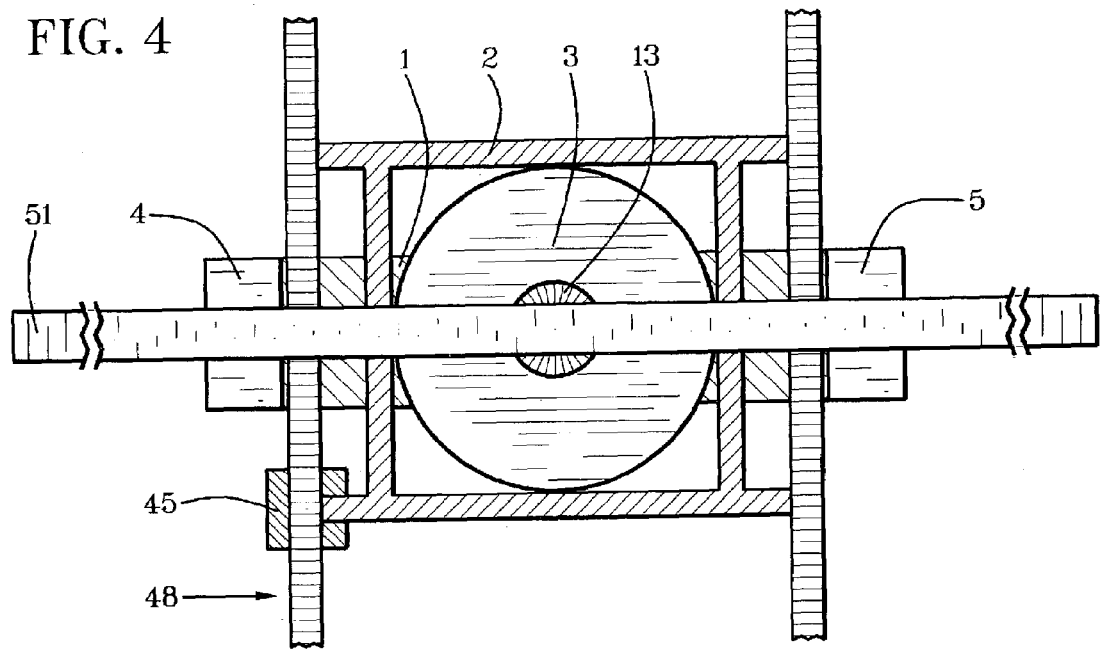
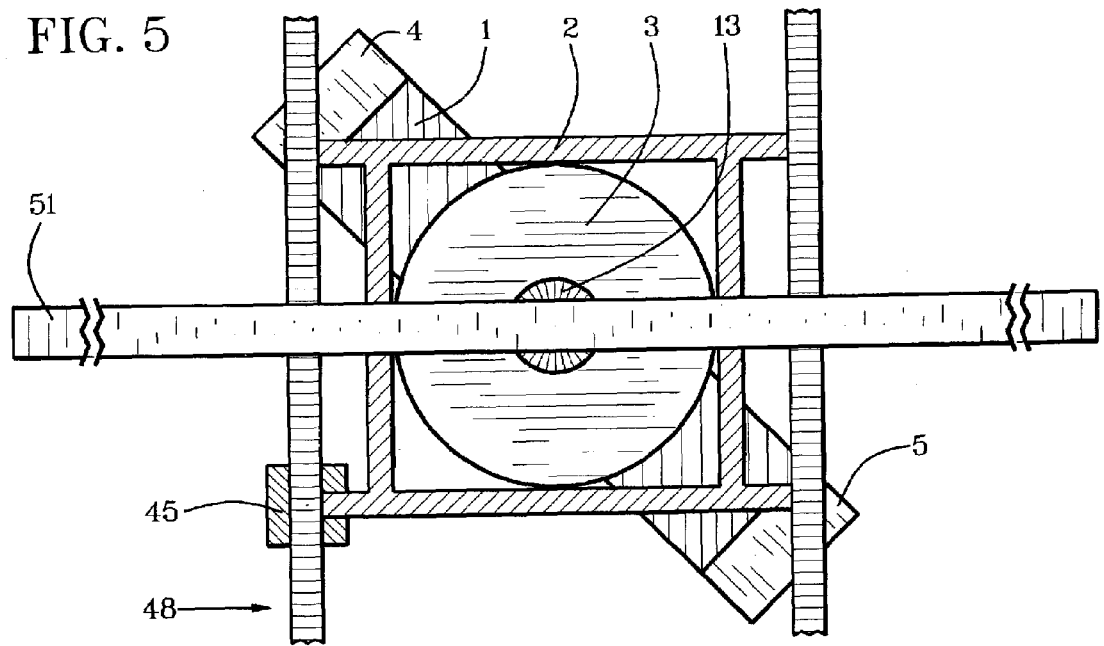

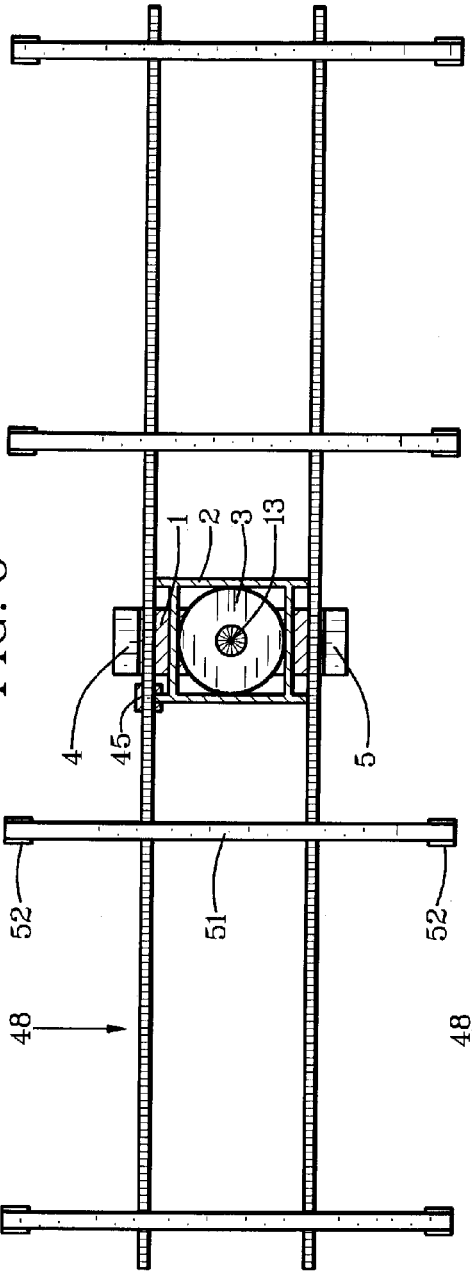
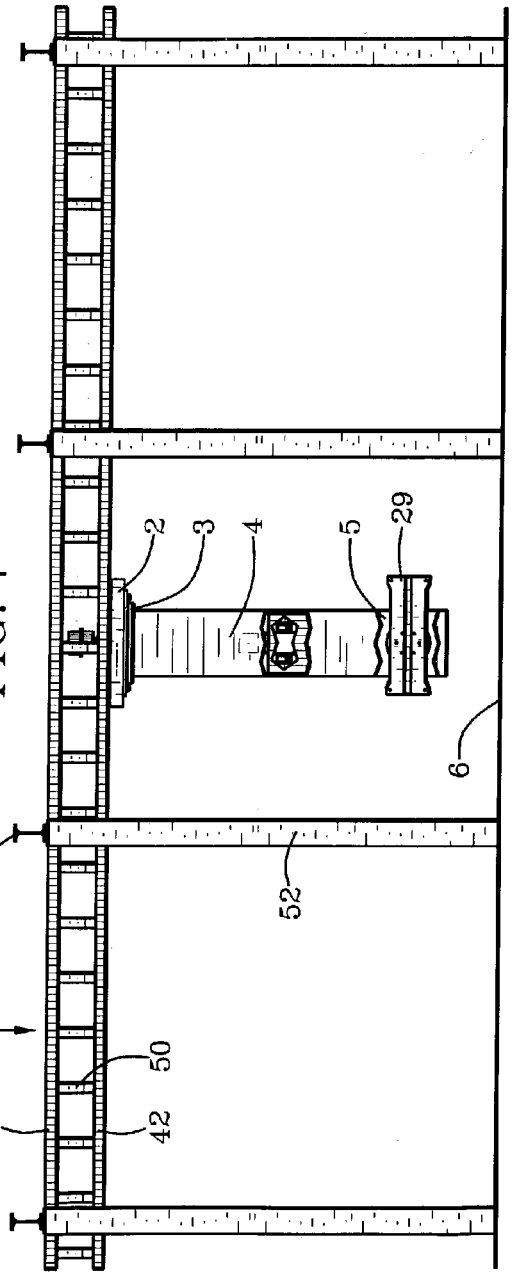

FIG. 10
FIG. 11
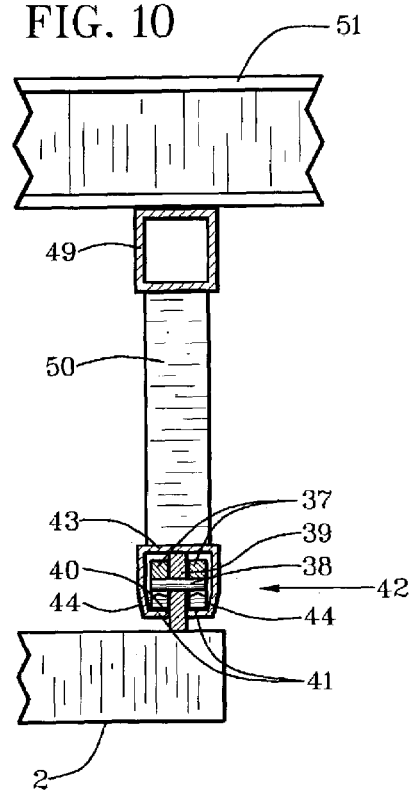
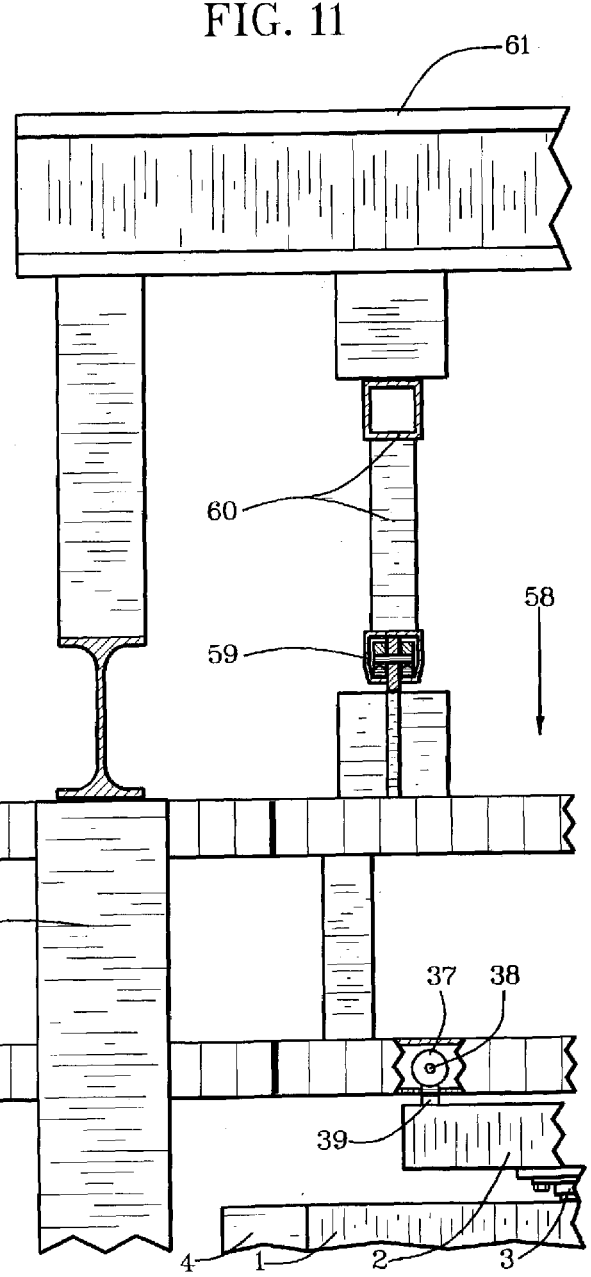

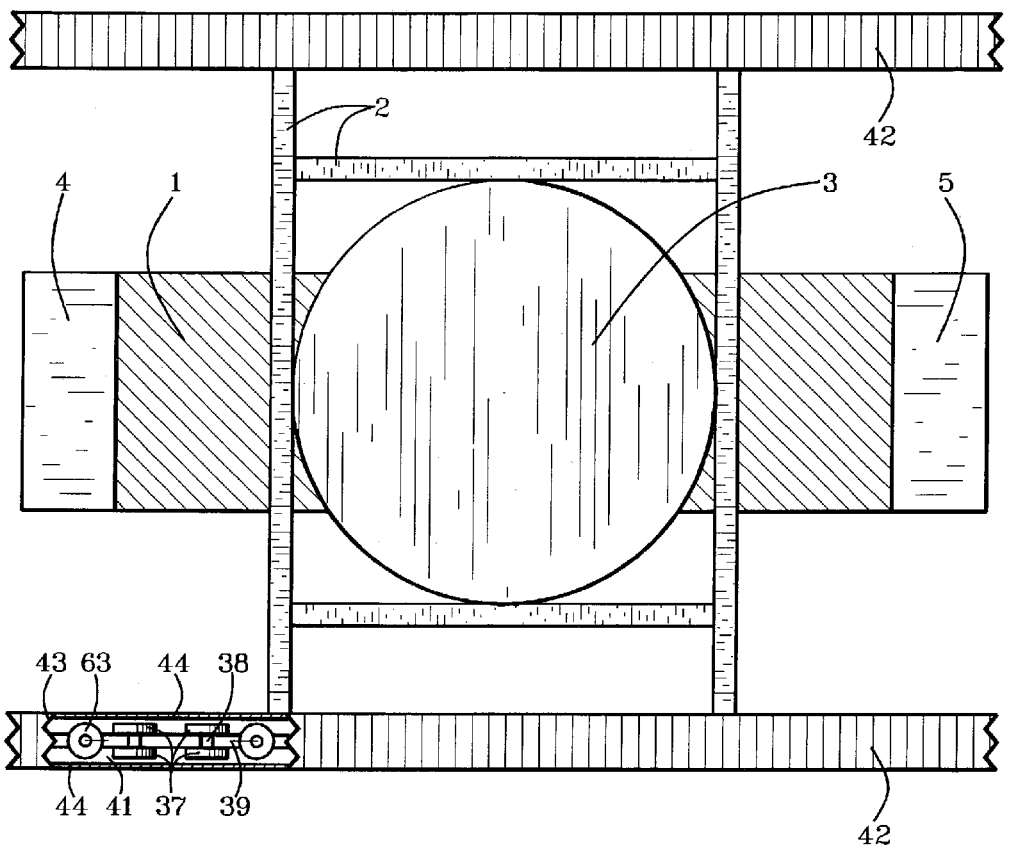
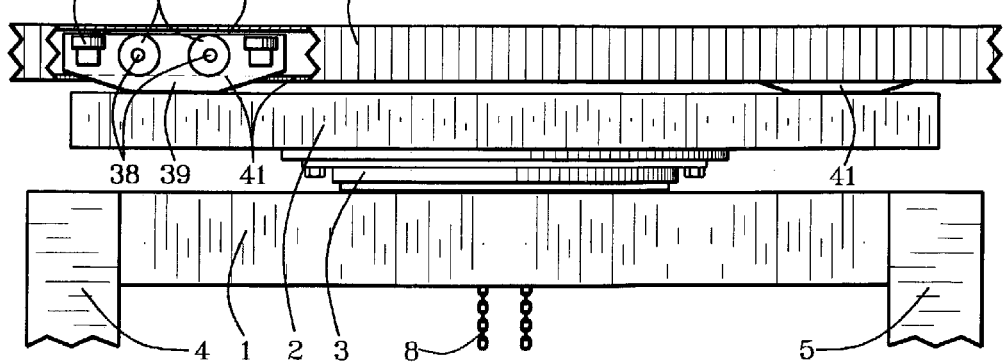

FIVE AXIS PRODUCTION LINE HANDLER

BACKGROUND OF THE INVENTION

1. Field of the Invention

This invention relates to five-axis handling of items on a production line.

2. Relation to Prior Art

Production lines generally are structured for maintaining a production item, such as an aircraft engine, a rocket engine, a car, a car engine or a machine of sorts in a fixed orientation. Some production lines provide item rotation in a single axis that is not precise and rigid for precision production. They do not allow complete, convenient and reliably precise access by production workers to all portions of an item as it proceeds to sequential production-line stations. Special time-consuming production-line adaptations are usually required to provide access to difficultly accessible areas of production items. The item orientation of previous production lines also does not provide handling and weighing for final inspection and crating.

There is no known five-axis production-line handler to provide complete, convenient and reliably precise start-to-shipment production-line access and handling of items in a manner taught by this invention.

Examples of most-closely related known but different devices are described in the following patent documents:

| Number | Date | Inventor | U.S. Class |
|---|---|---|---|
| U.S. Pat. No. 5,850,928 | Dec. 22, 1998 | Kahlman et al. | 212/285 |
| U.S. Pat. No. 4,781,517 | Nov. 01, 1988 | Pearce et al. | 414/590 |
| U.S. Pat. No. 4,466,770 | Aug. 21, 1984 | Peroutky | 414/751 |
| U.S. Pat. No. 4,082,191 | Apr. 04, 1978 | Whittingham | 212/59 R |
| U.S. Pat. No. 3,987,905 | Oct. 26, 1976 | Dechantsreiter | 212/18 |
| U.S. Pat. No. 3,887,080 | Jun. 03, 1975 | Wilson | 212/11 |

SUMMARY OF THE INVENTION

Objects of patentable novelty and utility taught by this invention are to provide a five-axis production-line handler having:

a five-axis handler that can position and orient an item in a production line for designedly accurate access to all production areas of the item by production workers and production equipment sequentially;

an optionally looped production line with an optional plurality of the five-axis handlers sequentially in a production-line loop for sequentially staged production of a plurality of production items;

optional computer-controllable five-axis positioning of the production item for its designedly robotic and manual production and/or assembly in the production line;

machinery rigidity and unyielding positioning of the production item for withstanding pressures of computer-automated, robotic and manual production operations which can include metal machining, cutting, drilling, welding, grinding, attachment of fasteners and attachment of components to the production item in the production line;

a production-line terminal with optional shipment weighing and handling for packaging and crating; and a production line that can be adapted to automated and manual production of a wide selection of items for which the production line and the five-axis production handler can be sized, shaped and structured predeterminedly.

This invention accomplishes these and other objectives with a production-line handler having a handler shoulder that is suspended rotatively downward from a gantry chassis. Two handler columns are spaced apart and suspended vertically downward from the handler shoulder. The handler columns terminate vertically above a production-line floor for allowing horizontally circumferential positioning of the handler columns by rotation of the handler shoulder. The handler columns include a hoist that raises and lowers a hoist carriage having item-rotation axles that are oppositely disposed horizontally on the handler columns for receiving and rotating production items on an axis between the handler columns. The gantry chassis is gantry-wheel mobile on a gantry rail system for linear travel along a production line. The production-line handler has five positioning axes which include (1) linear from horizontally forward and rearward travel of the gantry chassis along the production line on the gantry rail system, (2) laterally horizontal from travel of the gantry chassis perpendicularly to parallel production lines of a closed-loop production line for which the gantry rail system has a closed loop, (3) vertical from vertical travel of the item-rotation axles intermediate high and low portions of the handler columns, (4) vertical-axis rotation by rotation of the handler shoulder on the gantry chassis, and (5) horizontal-axis rotation by rotation of the production item on the item-rotation axles on the handler columns. Optionally, a sixth axis can be provided by lateral travel of the handler shoulder from-side-to-side intermediate sides of the production line. Additionally optional, a seventh axis can be provided by separately vertical travel of the item-rotation axles for askew orientation of a production item intermediate the handler columns. The rail system can be linear for a single production-line handler or looped for continuous production. The loop production can include an optional plurality of the production-line handlers that follow each other at an appropriate distance apart in a production-cycle loop. The five-axis production-line handler can be structured for designedly rigid and unyielding positioning of the production item for withstanding pressures of computer-automated, robotic and manual production operations that can include metal cutting, drilling, welding, grinding, attachment of fasteners, attachment of components, surfacing, painting, inspection, weighing and packaging of the production item in the production line.

BRIEF DESCRIPTION OF DRAWINGS

This invention is described by appended claims in relation to description of a preferred embodiment with reference to the following drawings which are explained briefly as follows:

FIG. 4 is a partially cutaway top view with the handler shoulder pivoted parallel to a gantry cross rod and perpendicular to the gantry channel beams;

FIG. 5 is a partially cutaway top view with the handler shoulder pivoted angularly to the gantry cross rod and to the gantry channel beams;

FIG. 6 is a top view of a straight production line with the gantry channel beams being positioned in line intermediate a start and a finish of the straight production line;

FIG. 7 is a partially cutaway side elevation view of the straight production line of FIG. 6;

FIG. 10 is a fragmentary partially cutaway end view of a gantry channel beam attached to a gantry cross rod and supporting a side of a gantry chassis;

FIG. 11 is a fragmentary partially cutaway end view of an end dual beam attached to a mobile carriage on an end cross rod and supporting a gantry chassis for transporting the gantry chassis and components of the five-axis production-line handler intermediate a first side section and a second side section of the loop production line;

FIG. 12 is a partially cutaway fragmentary top view of a gantry chassis supported by a tandem-gantry carriage that is mobile in the gantry channel beams; and FIG. 13 is a partially cutaway fragmentary side view of the FIG. 12 illustration.

DESCRIPTION OF PREFERRED EMBODIMENT

Figure 1:
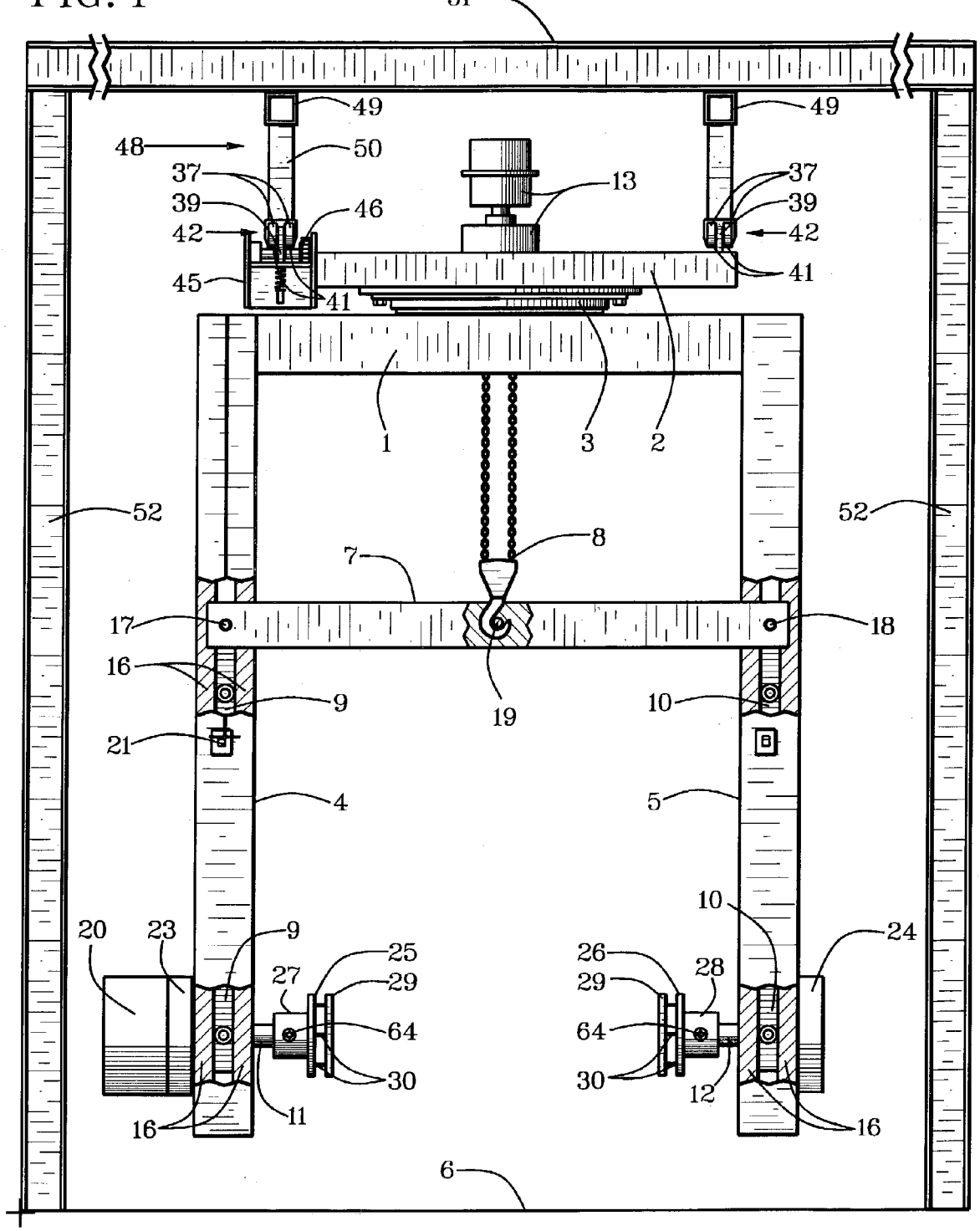
FIG. 1 is a partially cutaway end elevation view with a handler shoulder pivoted perpendicular to two gantry channel beams of a chassis rail system.

Listed numerically below with reference to the drawings are terms used to describe features of this invention. These terms and numbers assigned to them designate the same features throughout this description.

1. Handler shoulder
2. Gantry chassis
3. Shoulder axle
4. First handler column
5. Second handler column
6. Production-line floor
7. Hoist
8. Hoist lifter
9. First hoist carriage
10. Second hoist carriage
11. First item-rotation axle
12. Second item-rotation axle
13. Shoulder rotator
14. Motorized shoulder rotator
15. Parallel slideway surfaces
16. Parallel sliders
17. First pivotal attachment
18. Second pivotal attachment
19. Hoist pivotal attachment
20. Item rotator
21. Rotational switch
22. Manual-rotation handle
23. First brake
24. Second brake
25. First item holder
26. Second item holder
27. First-axle hub
28. Second-axle hub
29. Attachment plate
30. Flexible fasteners
31. Positional handler shoulder
32. Shoulder slideways
33. Column sliders
34. Column positioner rod
35. Positional motor
36. Positioning nuts
37. Gantry wheels
38. Juxtaposed-wheel axles
39. Chassis supports
40. Channel aperture
41. Channel floor
42. Gantry channel beams
43. Top wall
44. Side walls
45. Chassis drive unit
46. Beam wheel
47. Straight production line
48. Dual beams
49. Stiffener beams
50. Beam connectors
51. Gantry cross rods
52. Gantry pillars
53. Loop production line
54. First side section
55. First end section
56. Second side section
57. Second end section
58. End dual beams
59. Mobile carriage
60. Cross gantry beams
61. End cross rods
62. End pillars
63. Side-guide wheels
64. Set screw Referring to FIGS. 1–3, a handler shoulder 1 is hangable rotatively downward from a gantry chassis 2 that is rotational on a shoulder axle 3 intermediate the gantry chassis 2 and the handler shoulder 1. The handler shoulder 1 and the shoulder axle 3 can be can be articulated, structured, sized and proportioned for handling predetermined sizes, weights and structures of production items, including jet engines, cars and equipment, while their production steps and processes proceed. The shoulder axle 3 shown is representative of a plate-like axle having a large diameter that can be supported horizontally and vertically for short overall construction in contrast to being optionally longer and thinner for proportionately higher overall construction. Correspondingly, the gantry chassis 2 can be articulated, structured, sized and proportioned for mobility on a designedly mating gantry rail system.

Two handler columns are spaced apart and suspended vertically downward from the handler shoulder 1. The two handler columns include a first handler column 4 that is suspended vertically downward from a first portion of the handler shoulder 1 on a first side of the shoulder axle 3 and a second handler column 5 that is suspended vertically downward from a second portion of the handler shoulder 1 on a second side of the shoulder axle 3. The handler columns terminate vertically above a production-line floor 6 for allowing horizontally circumferential positioning of the handler columns by rotation of the handler shoulder 1 about a vertical axis of the shoulder axle 3.

A hoist 7 having a first hoist portion proximate the first handler column 4 and a second hoist portion proximate the second handler column 5 has a hoist lifter 8 intermediate the handler shoulder 1 and the hoist 7. The hoist lifter 8 is articulated for raising and lowering the hoist 7 on the handler columns selectively. A chain pulley shown is representative of lift or elevator systems that can include a pulley system or a screw system for the hoist 7. The hoist lifter 8 can include a motorized pulley intermediate the handler shoulder 1 and the hoist 7. Also included for the hoist 7 can be a weighing device.

A first hoist carriage 9 is attached to the first hoist portion and a second hoist carriage 10 is attached to the second hoist portion. The first hoist carriage 9 is in vertical-travel contact with the first handler column 4 and the second hoist carriage 10 is in vertical-travel contact with the second handler column 5. The hoist carriages can include a wide selection of slideway contact and or roller contact with the handler columns. Representations of both slideway and roller contact are shown. Bearing surfaces between the hoist carriages and the handler columns also can be full-length or sectional.

A first item-rotation axle 11 is attached rotatively to the first hoist carriage 9 and a second item-rotation axle 12 is attached rotatively to the second hoist carriage 10. The item-rotation axles are used for rotating production items in order to access bottom, side and top portions of the production items for steps of production and for sound identification of stray parts and tools in the production items.

A shoulder rotator, which can include a motorized shoulder rotator 13, on the gantry chassis 2 is employed for rotating the handler shoulder 1 selectively on the shoulder axle 3. The motorized shoulder rotator 13 can be programmable, radio controlled, switch controlled and can include predetermined circumferential indexing. The shoulder axle 3 can be made to include functions similar to a computer-controlled rotary table and/or indexing table for circumferential positioning of the handler shoulder 1.

The two handler columns can include parallel slideway surfaces 15 with the first hoist carriage 9 including parallel sliders 16 in sliding contact with parallel slideway surfaces 15 of the first handler column 4 and with the second hoist carriage 10 including the parallel sliders 16 in sliding contact with parallel slideway surfaces 15 of the second handler column 5. The sliders and slideways shown are representative of a plurality of traveling-contact systems and physical principles with friction-reduction contact that can be selected and designed for the parallel slideway surfaces 15 and parallel sliders 16.

The first hoist portion can include a first pivotal attachment 17 to the first hoist carriage 9, the second hoist portion can include a second pivotal attachment 18 to the second host carriage 10 and the hoist 7 can include a hoist pivotal attachment 19 to the hoist lifter 8 for askew orientation of attachment of a production item, which is not shown, intermediate the first item-rotation axle 11 and the second item-rotation axle 12.

The first item-rotation axle II includes an item rotator 20 for rotating the first item-rotation axle 11, any item on the first item-rotation axle 11 and any item attached to the first item-rotation axle 11 and to the second item-rotation axle 12 to which a production item is attached. The item rotator 20 can include a motorized rotator which can include electrical motorization with a rotational switch 21 positioned on at least one of the two handler columns. Additionally, the item rotator 20 can include a manual-rotation handle 22 for emergency and special situations.

The first item-rotation axle 11 includes a first brake 23 for maintaining a desired circumferential positioning of the first item-rotation axle 11, any item on the first item-rotation axle 11 and any item attached to the first item-rotation axle 11 and to the second item-rotation axle 12. The second item-rotation axle 12 includes a second brake 24 for maintaining a desired circumferential positioning of the second item-rotation axle 12, any item on the second item-rotation axle 12 and any item attached to the second item-rotation axle 12 and to the first item-rotation axle 11.

The first item-rotation axle 11 includes a first item holder 25 and the second rotation axle 12 includes a second item holder 26 for holding select production items intermediate the first item holder 25 and the second item holder 26 while the select production items are being produced selectively.

The first item holder 25 includes a first-axle hub 27 that is affixable circumferentially and linearly on the first item-rotation axle 11 with a fastener that can include a set screw 64. Correspondingly, the second item holder 26 includes a second-axle hub 28 that is affixable circumferentially and linearly on the second item-rotation axle 12. A first attachment member, which can include an attachment plate 29, is affixable to the first-axle hub 27. A second attachment member, which can include the attachment plate 29 is affixable to the second-axle hub 28. The first attachment member can include an item-contact area that is articulated for receiving, positioning and being attached to a first portion of a production item and the second attachment member includes an item-contact area that is articulated for receiving, positioning and being attached to a second portion of a production item.

The first attachment member and the second attachment member are preferably affixed to the first-axle hub 27 and to the second-axle hub 28 with flexible fasteners 30 or an adaptation of a ball joint for allowing askew attachment of particular production items to the first-axle hub 27 and to the second-axle hub 28 respectively.

As shown in FIGS. 1–2 and 4–9, the handier shoulder 1 can include a fixed-size handler shoulder 1 with the handler columns being fixed distances apart and fixed distances outward radially from the shoulder axle 3. Optionally, as shown in FIG. 3, the handler shoulder 1 can include a positional handler shoulder 31 that provides positioning of the first handler column 4 and the second handler column 5 select distances apart and outward radially from the shoulder axle 3. The positional handler shoulder 31 can include shoulder slideways 32 and the handler columns can include column sliders 33 that slide on the shoulder slideways 32 for adjustment of distances of the handler columns 4 and 5 apart and outwardly from the shoulder axle 3.

A column-positioner rod 34 is opposite-directionally threaded externally and rotated by a positional motor 35 that is positioned on the positional handler shoulder 31. The handler columns can include positioning nuts 36 having internal threads positioned proximate the column sliders 33 to receive the column-positioner rod 34 for increasing distances of the handler columns apart by rotation of the column-positioner rod 34 in a first direction and for decreasing distances of the handler columns apart by rotation of the column-positioner rod 34 in a second direction of rotation with the positional motor 35.

Referring to FIGS. 1, 4–7 and 10–13, the five-axis production-line handler can include a handler shoulder 1 that is hung, as an option to being hangable, rotatively downward from a gantry chassis 2 having gantry-wheel mobility on a gantry rail system that is articulated for a predetermined production line. The gantry rail system includes two gantry channel beams 42 that are articulated for the predetermined production line. A plurality of sets of gantry wheels 37 on the gantry chassis 2 are included for the gantry-wheel mobility on the gantry channel beams 42. The plurality of the sets of the gantry wheels 37 can include juxtaposed gantry wheels 37 which are each rotational on juxtaposed-wheel axles 38 which are shown in FIGS. 10–13. A plurality of chassis supports 39 are each attached to the juxtaposed-wheel axle 38 intermediate the gantry wheels 37 of the sets of the gantry wheels 37.

The chassis supports 39 are each suspended downward to the gantry chassis 2 through a channel aperture 40 in each of the gantry channel beams 42. The chassis supports 39 are attached to the gantry chassis 2 for carriage support of the gantry chassis 2 with the gantry wheels 37 each riding on one of two channel floors 41 which are oriented horizontally on opposite sides of the channel aperture 40 in each of the gantry channel beams 42.

As depicted in FIG. 10, the gantry channel beams 42 each include a top wall 43 that is oriented horizontally, the two channel floors 41, and two oppositely disposed side walls 44 that are slanted inwardly relative to outside edges of the top wall 43 to outside edges of the channel floors 41 which are narrower than the top wall 43. The channel floors 41 are on opposite sides the of channel apertures 40 through which the chassis supports 39 are suspended. The gantry wheels 37 are positioned designedly close to the oppositely disposed side walls 44 for allowing rotational engagement of the gantry wheels 37 with bottom portions of the oppositely disposed side walls 44 while rotational contact of sides of the gantry wheels 37 with the oppositely disposed side walls 44 is prevented for precise-alignment and minimally obstructed travel of the gantry chassis 2 on the gantry channel beams 42.

Figure 2:
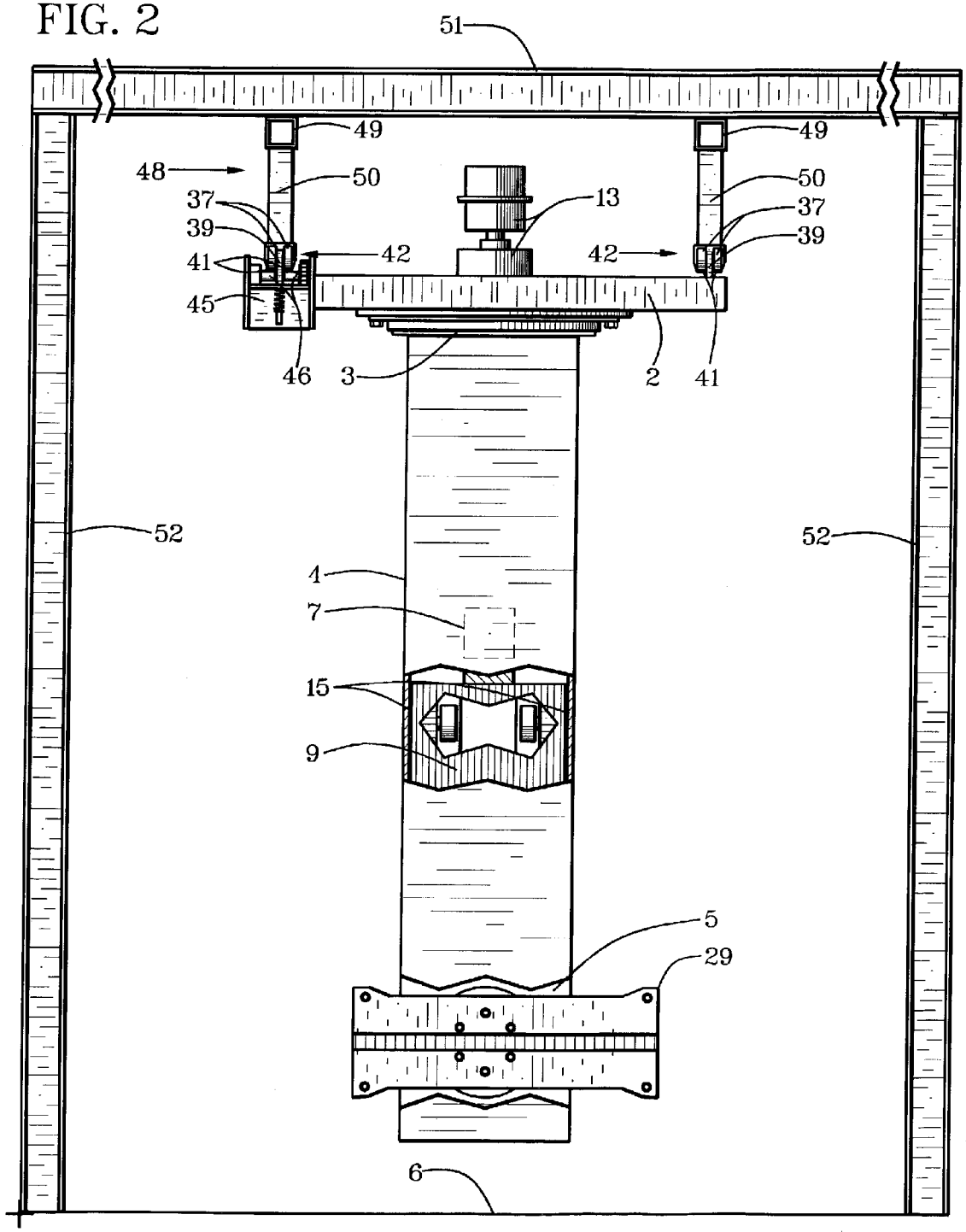
FIG. 2 is the FIG. 1 illustration with the handler shoulder pivoted parallel to the two gantry channel beams and showing a cutaway elevation view of a handler column suspended from the handler shoulder.
Figure 3:
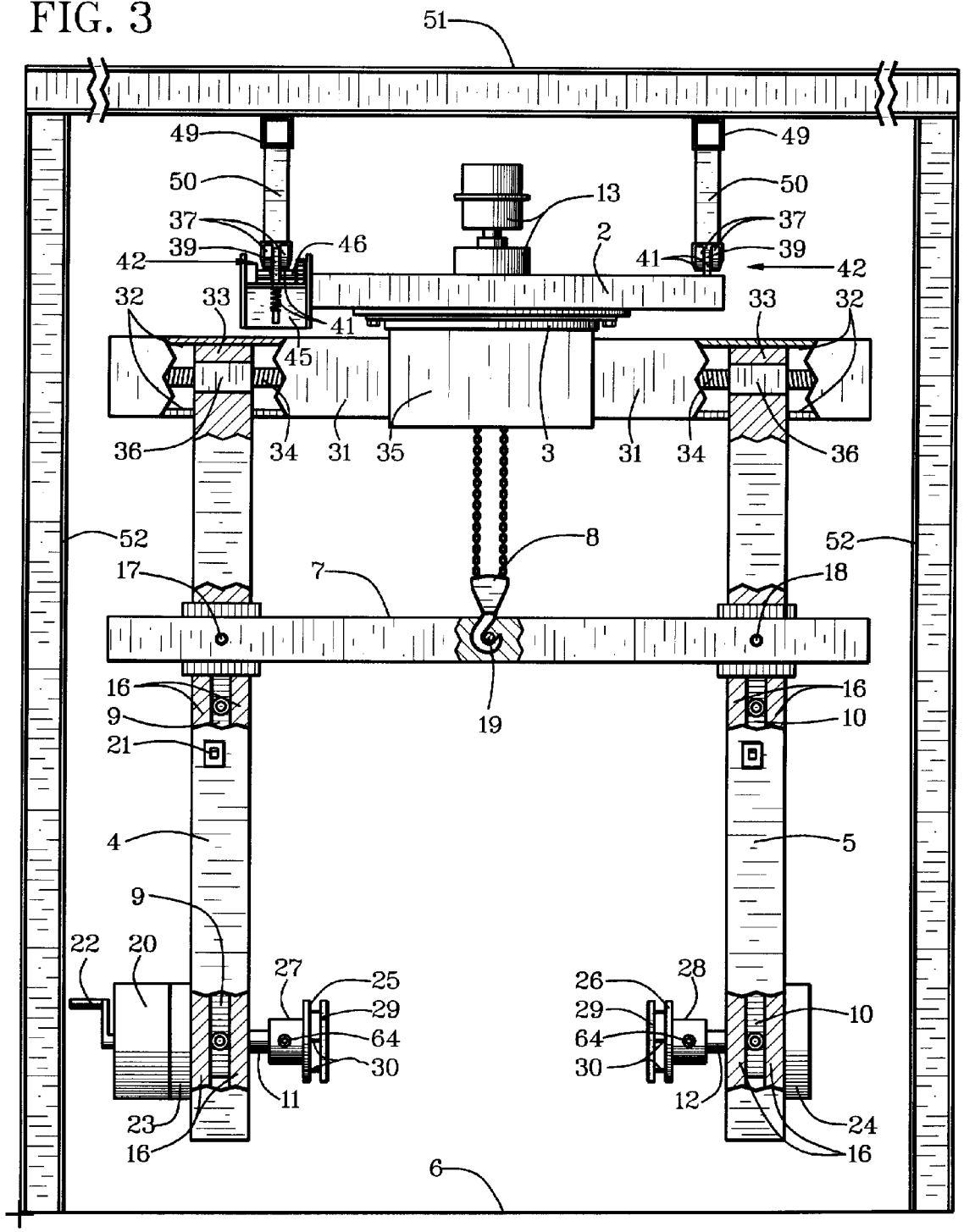
FIG. 3 is a partially cutaway end elevation view with a positional handler shoulder with the two handler columns on sideways for being positioned select distances apart.
Figure 8:
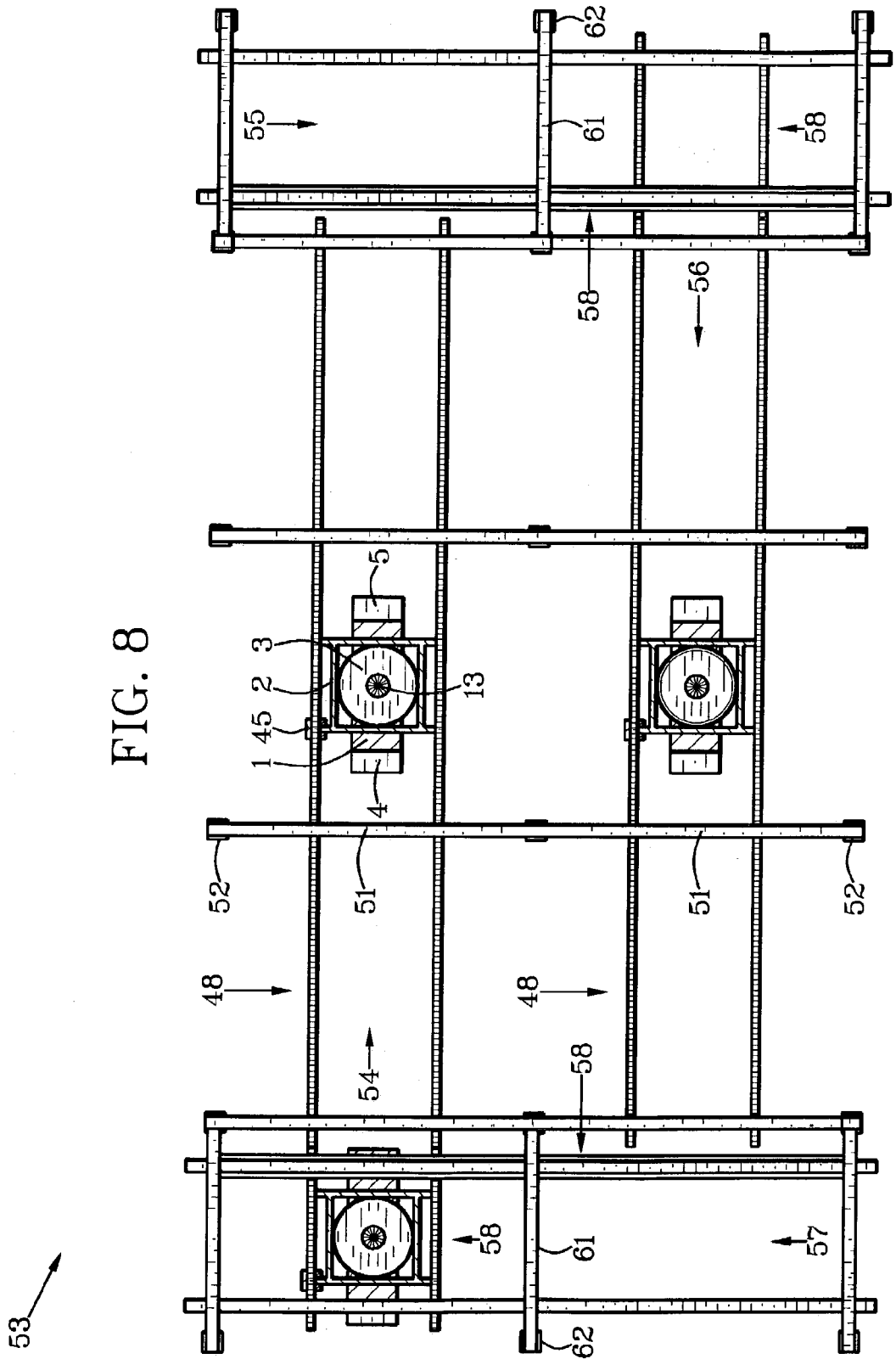
FIG. 8 is a top view of a loop production line.
Figure 9:
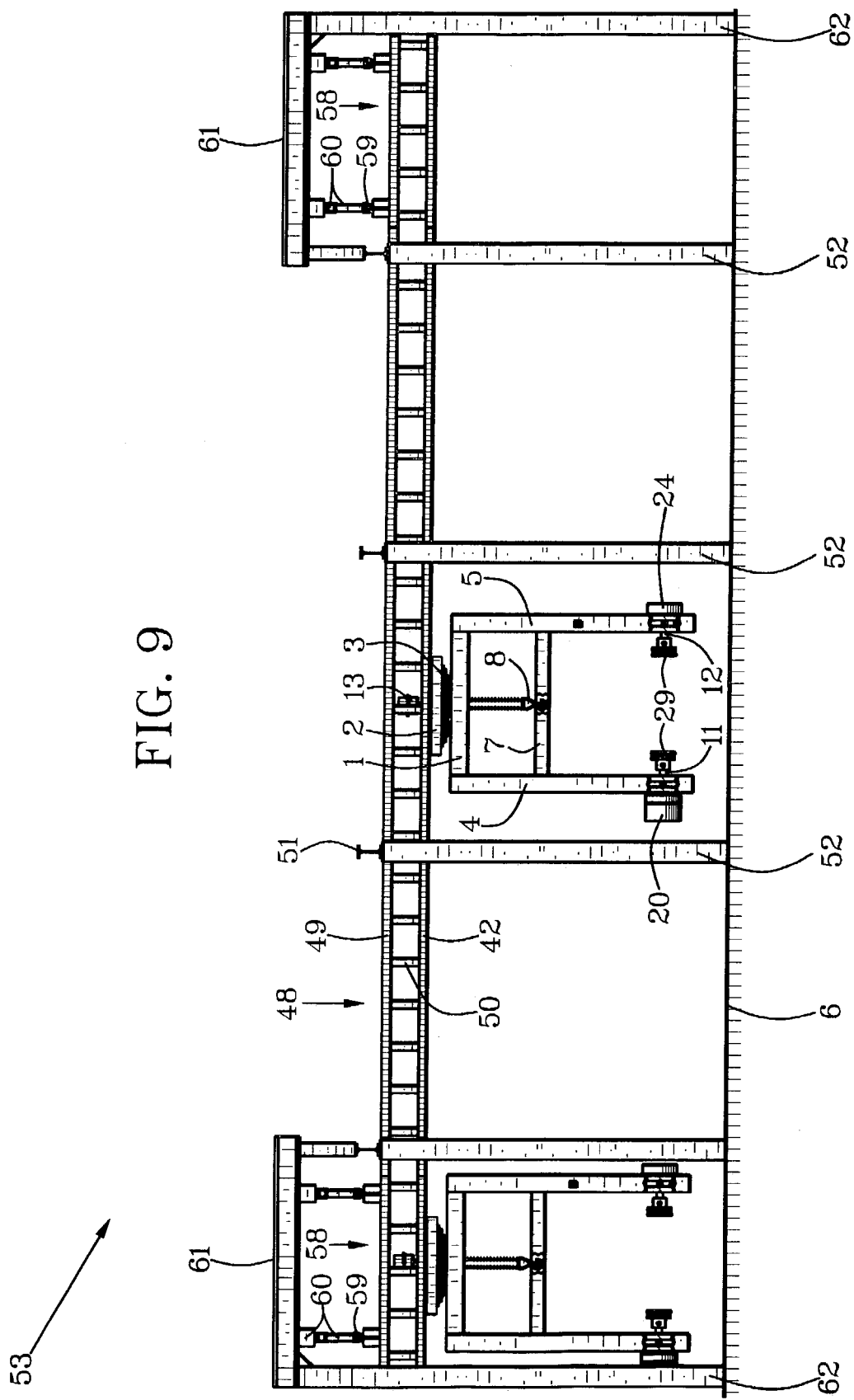
FIG. 9 is a side elevation view of the loop production line.

As shown in FIGS. 1–3, the gantry chassis 2 can include at least one chassis drive unit 45 which includes a motor in rotational communication with a beam wheel 46 that is in upwardly supported contact with a bottom surface of at least one of the gantry channel beams 42 for propelling the gantry chassis 2 along the gantry channel beams 42 selectively.

Referring to FIGS. 1–3 and 6–7, the production line can include a straight production line 47 for which the gantry channel beams 42 can include dual beams 48. The gantry channel beams 42 are bottom beams and stiffener beams 49 are top beams that are positioned predeterminedly above the gantry channel beams 42. The gantry channel beams 42 and the stiffener beams 49 are spaced apart vertically and joined with beam connectors 50 between them.

The dual beams 48 are suspended downward vertically from gantry cross rods 51 to which the stiffener beams 49, the top beams, are attached. The gantry cross rods 51 are oriented perpendicularly to the gantry channel beam 42 and are positioned on gantry pillars 52. The gantry pillars 52 are spaced apart laterally at distances from outsides of the gantry channel beam 42 for receiving the dual beams 48, the handler shoulder 1 and production items. The gantry pillars 52 are spaced apart parallel to the dual beams 48 for a production-line distance intermediate a beginning and an end of a straight production line 47 predeterminedly. A beginning and an end of the straight production line 47 are not designated because production can be in either direction.

Referring to FIGS. 1–3 and 8–13, the production line can include a loop production line 53 for continuous production with one or more of the five-axis production-line handlers being operational in the loop production line 53. The loop production line 53 includes a first side section 54, a first end section 55, a second side section 56 and a second end section 57.

The gantry channel beams 42 for the first side section 54 and the second side section 56 each include the dual beams 48 with the gantry channel beams 42 and the stiffener beams 49 spaced apart vertically and joined with the beam connectors 50 predeterminedly. The dual beams 48 for the first side section 54 and the second side section 56 include side dual beams 48 that have side-production lengths which are predetermined for achieving side-production objectives. The side dual beams 48 are suspended downward vertically from horizontal gantry cross rods 51 to which the top beams, the stiffener beams 49, are attached.

The gantry cross rods 51 are oriented perpendicularly to the gantry channel beams 42 and are positioned on the gantry pillars 52. The gantry pillars 52 are spaced apart laterally at distances from outsides of the gantry channel beams 42 for receiving the side dual beams 48, the handler shoulder 1 and production items. The gantry pillars 52 are spaced apart parallel to the side dual beams 48 throughout production-line distances intermediate starts and finishes of the first side section 54 and the second side section 56 respectively.

The first end section 55 and the second end section 57 each include end dual beams 58 with cross-channel lengths for receiving the gantry wheels 37 with the end dual beams 58 being lined up concentrically with the gantry channel beams 42 for transporting the end dual beams 58 and the gantry chassis 2 thereon from the first side section 54 to the second side section 56 at the first end section 55 and for transporting the gantry chassis 2 thereon from the second side section 56 to the first side section 54 at the second end section 57 of the lop production line 53.

The end dual beams 58 for the first end section 55 and for the second end section 57 are affixable to mobile carriages 59 on cross gantry beams 60 which are suspended from end cross rods 61 on end pillars 62 intermediate the first side section 54 and the second side section 56.

Production can proceed in either direction and can be made to begin at any point on the loop production line 53.

Referring to FIGS. 1 and 12–13, the gantry wheels 37 can be tandem on chassis supports 39 which can house tandem gantry wheels 37 and side-guide wheels 63. Preferably the gantry wheels 37, whether dual and/or tandem, are positioned proximate each of four corners of the gantry chassis 2.

A new and useful five-axis production-line handler having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A five-axis production line handler that positions and orients an item on a production line gantry chassis rail system comprising:

a handler shoulder fixedly suspended vertically downward from the gantry chassis;

the handler shoulder being rotational on a plate like shoulder axle intermediate the gantry chassis and the handler shoulder;

the gantry chassis being mobile on the gantry chassis rail system;

two spaced apart handler columns fixedly suspended vertically downward from the handler shoulder;

the two handler columns including a first handler column fixedly suspended vertically downward from a first portion of the handler shoulder on a first side of the shoulder axle and a second handler column fixedly suspended vertically downward from a second portion of the handler shoulder on a second side of the shoulder axle;

the handler columns terminate vertically above a production line floor, horizontally circumferentially positioned by rotation of the handler shoulder about a vertical axis of the shoulder axle;

each of the two handler columns include parallel vertical slideway surfaces;

a hoist having a first hoist portion pivotally attached within the first handler column and a second hoist portion pivotally attached within the second handler column;

a hoist lifter intermediate the handler shoulder and the hoist;

the hoist lifter raises and lowers the hoist within the handler columns selectively;

a first hoist carriage pivotally attached to the first hoist portion;

a second hoist carriage pivotally attached to the second hoist portion;

the hoist pivotally attached to the hoist lifter;

the first hoist carriage being in traveling contact within the first handler column and the second hoist carriage being in traveling contact within the second handler column;

the first hoist carriage includes parallel sliders in sliding contact with the parallel slideway surfaces of the first handler column;

the second hoist carriage includes parallel sliders in sliding contact with parallel slideway surfaces of the second handler column;

a first item rotation axle attached rotatively to the first hoist carriage; and a second item-rotation axle attached rotatively to the second carriage, the first item-rotation axle includes a first item holder and the second item rotation axle includes a second item holder for holding select production items intermediate the first item holder and the second item holder while being produced selectively the first item holder includes a first-axle hub affixed circumferentially and linearly on the first item-rotation axle, the second item holder includes a second-axle hub affixed circumferentially and linearly on the second item-rotation axle, a first attachment plate connected to the first axle hub includes an item-contact area that receives and positions a first portion of a production item, a second attachment plate connected to the second axle hub includes an item contact area that receives and positions a second portion of a production item, the first item-rotation axle includes an item rotator and a first brake, said first brake maintains desired circumferential positioning of the first item-rotation axle, any item on the first item-rotation axle and any item attached between the first-item rotation axle and to the second item rotation axle, the first and second attachment plates affixed to the first and second-axle hubs with flexible fasteners providing askew attachment on the axle hubs, wherein the handler is structured for designedly rigid and unyielding positioning of the production item.

2. The five-axis production-line handler of claim 1—and further—comprising:

a shoulder rotator on the gantry chassis for rotating the handler shoulder selectively on the shoulder axis.

3. The five-axis production-line handler of claim 2 wherein:

the shoulder rotator includes a motorized shoulder rotator.

4. The five-axis production-line handler of claim 3 wherein:

the motorized shoulder rotator includes programmable shoulder rotation.

5. The five-axis production-line handler of claim 3 wherein:

the motorized shoulder rotator includes radio-control rotation.

6. The five-axis production-line handler of claim 3 wherein:

the motorized shoulder rotator includes predetermined circumferential indexing.

7. The five-axis production-line handler of claim 3 wherein:

the motorized shoulder rotator includes the programmable shoulder rotation, radio-control rotation and predetermined circumferential indexing.

8. The five-axis production-line handler of claim 1 wherein:

the hoist lifter includes a pulley intermediate the handler shoulders and the hoist.

9. The five-axis production-line handler of claim 8 wherein:

the pulley includes a motorized pulley.

10. The five-axis production-line handler of claim 1 wherein:

the item rotator rotates the first item rotation axle, any item on the first item-rotation axle and any item attached to the first item-rotation axle and to the second item-rotation axle.

11. The five-axis production-line handler of claim 10 wherein:

the item rotator includes a motorized rotator.

12. The five-axis production-line handler of claim 11 wherein:

the motorized rotator includes electrical motorization with a rotational switch positioned on at least one of the two handler columns.

13. The five-axis production-line handler of claim 1 wherein:

the second item-rotation axle includes a second brake for maintaining a desired circumferential positioning of the second item-rotation axle, any item on the second item rotation axle and any item attached to the second item-rotation axle and to the first item-rotation axle.

14. The five-axis production-line handler of claim 1 wherein;

the handler shoulder includes a fixed-sized handler shoulder with the handler columns being fixed distances apart and fixed distances outward radially from the shoulder axle.

15. The five-laxis production-line handler of claim 1 wherein:

the handler shoulder includes a positional handler shoulder and the handler columns are positioned select distances apart and outward radially from the shoulder axle.

16. The five-axis production-line handler of claim 1 comprising:

the gantry chassis rail system being articulated for a predetermined production line.

* * * * *